Oct. 28, 1941.　　　　　R. LEWIS　　　　　2,260,468
SIX WHEEL MOTOR VEHICLE
Filed Feb. 28, 1938　　　　　3 Sheets-Sheet 1
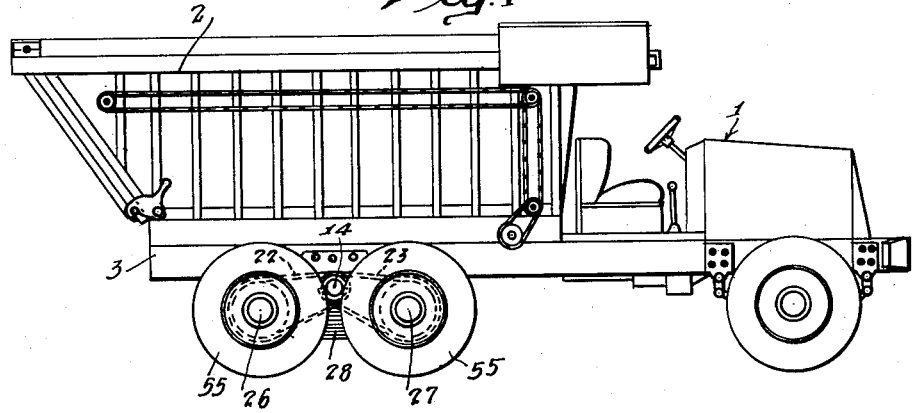
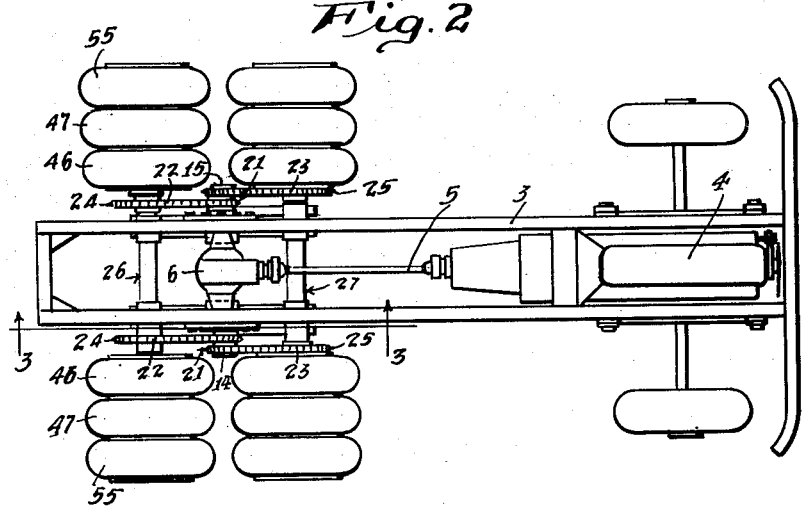
Inventor
Raymond Lewis
By Lyon & Lyon
Attorneys

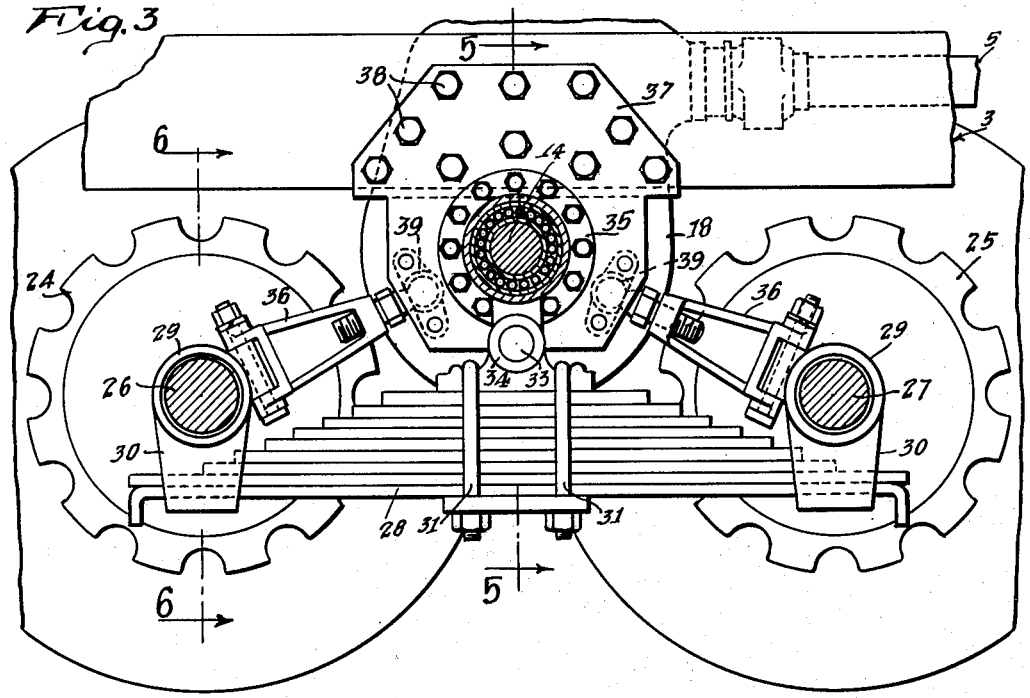
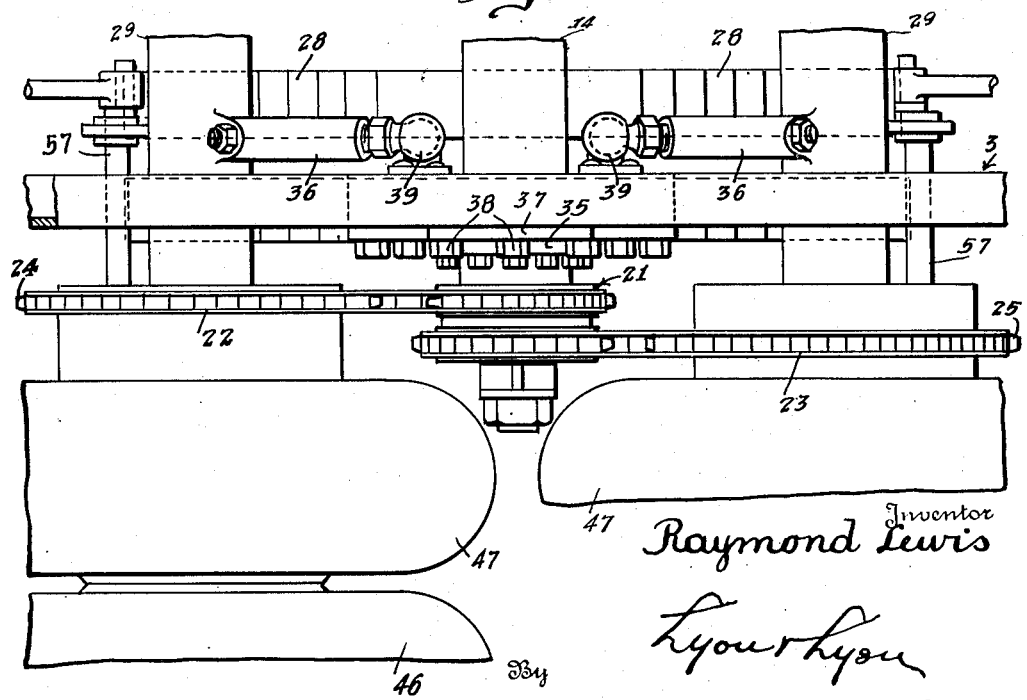

Oct. 28, 1941.  R. LEWIS  2,260,468

SIX WHEEL MOTOR VEHICLE

Filed Feb. 28, 1938  3 Sheets-Sheet 3

Inventor
Raymond Lewis
By Lyon & Lyon
Attorneys

Patented Oct. 28, 1941

2,260,468

UNITED STATES PATENT OFFICE 2,260,468

SIX WHEEL MOTOR VEHICLE

Raymond Lewis, Los Angeles, Calif.

Application February 28, 1938, Serial No. 193,105

3 Claims. (Cl. 180—22)

This invention relates to a six wheel motor vehicle, and more particularly to the construction and design of the driving wheels and their attachment to the structure.

The present invention has for its general object the provision of a six wheel motor vehicle which may have a low center of gravity, while being capable of use in a truck designed to handle very large loads.

The truck of the present invention was particularly designed for the purpose of moving very large quantities of earth, although many of the features of construction thereof may be with advantage adapted for use on trucks of smaller size or design for carrying lesser loads.

In accordance with the present invention, provision is made for operating a plurality of tires upon each of the driving wheels of the truck in order to acquire a large traction area while maintaining a reduced height. The present invention also includes an arrangement and combination of parts and elements by which one or more of the tires for each driving wheel may be frictionally driven in operation. A further feature of the present invention resides in a novel arrangement of bearings by which a plurality of tires may be most suitably supported on the driving wheel. A further feature of the present invention relates to the construction and arrangement of the springs for the driving wheel which are arranged in dual or multiple sets so as to permit a relatively large carrying area with respect to the necessary height of the structure. A further feature of the present invention resides in the supporting mechanism for the axles of the driving wheels and means of connecting the same to the spring and to the driving shafts so that the springs may be pivotally mounted at a point substantially below the axis of the driving shafts.

Various further objects and advantages of the present invention will be apparent from a description of a preferred form or example of a six wheel motor vehicle embodying the invention, and for that purpose the invention is hereinafter described with reference to the accompanying drawings which illustrate one form or example of the invention.

In the drawings:

Figure 1 is an elevation of a six wheel truck embodying the present invention.

Figure 2 is a plan view with the truck body removed from the chassis.

Figure 3 is an enlarged fragmentary section of the driving structure taken on the line 3—3 of Figure 2.

Figure 4 is a fragmentary plan view of the mechanism shown in Figure 3.

Figure 5:
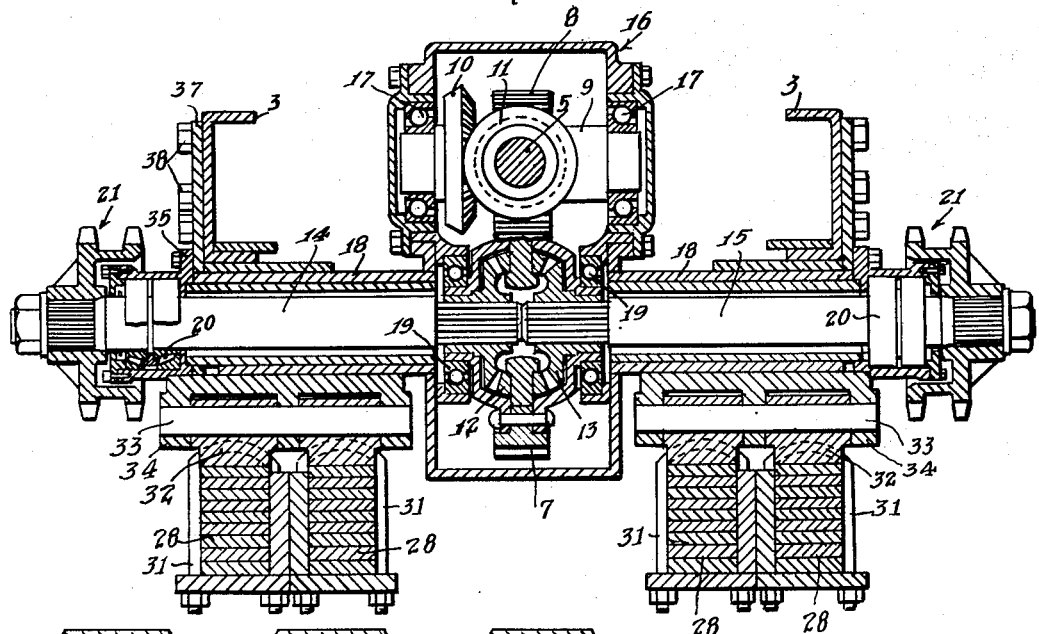
Figure 5 is a section on the line 5—5 of Figure 3.
Figure 6:
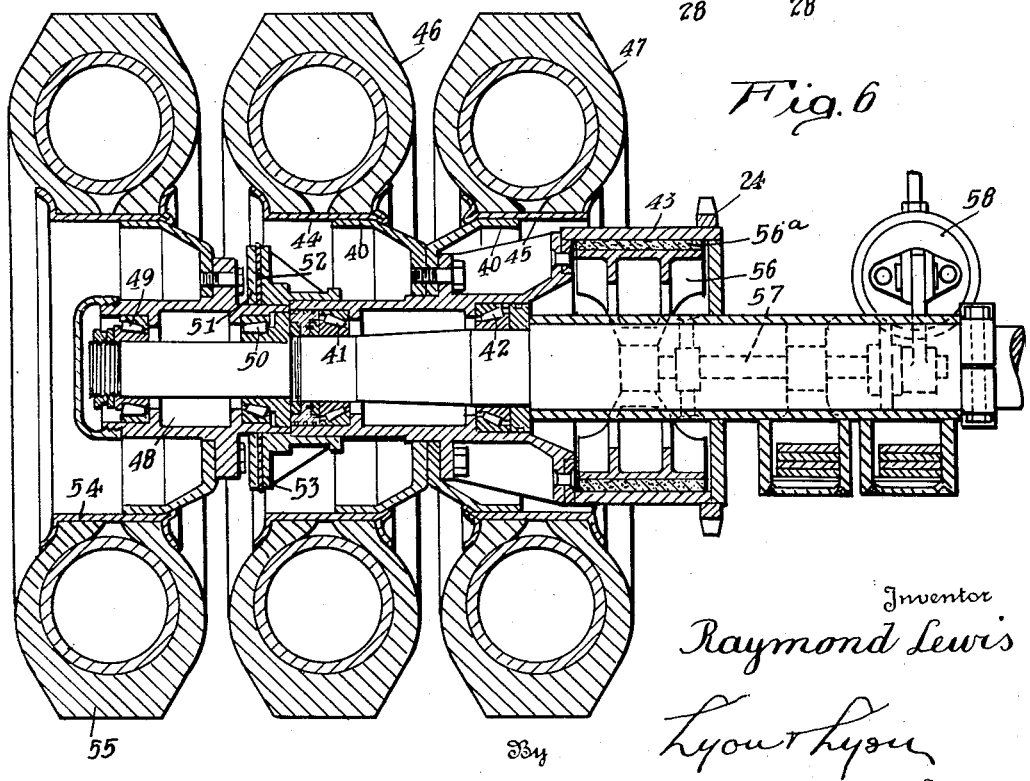
Figure 6 is a section on the line 6—6 of Figure 3.

Referring to the drawings, there is illustrated a six wheel truck 1, the body 2 of which may be of any desired or preferred form, although the truck body is indicated as embodying an ejecting form of the type described in the copending application of Raymond Lewis and Forest M. Bodenhamer, Serial No. 175,458, filed on November 19, 1937, now Patent 2,179,726.

The truck is indicated as having a suitable frame 3 supporting the driving motor 4 connecting the shaft 5 to a differential 6. Any usual or preferred form of differential drive may be provided. The particular form illustrated comprises a ring gear 7 driven by gear 8 on a counter shaft 9 connected by gears 10 and 11 to the drive shaft 5, differential gears 12 and 13 of the differential drive with driving shafts 14 and 15. The counter shaft 9 is shown mounted in a suitable housing 16 on bearings 17.

Drive shafts 14 and 15 are mounted in a suitable rear axle housing 18 and are provided with bearings 19 on their inner ends and with suitable roller bearings 20 at their outer ends. Each of the drive shafts is connected to the driving wheels on one side of the vehicle and since the connections are the same only one thereof will be described.

Each drive shaft is provided with a double sprocket 21 by which the drive shaft is connected by chains 22 and 23 with the driving wheels 24 and 25, respectively. The driving wheels 24 and 25 are mounted upon axles 26 and 27, respectively, which extend transversely of the frame 3, so that each of the axles 26 and 27 supports driving wheels on opposite sides of the vehicle.

The axles 26 and 27 support the vehicle on springs 28. In order to provide for adequate support while maintaining a reduced height, the springs 28 are provided in dual or multiple form. The supporting axles 26 and 27 are each provided with housings 29 having stirrups 30 slidably supporting the outer ends of the dual springs 28. The centers of the dual springs are held by spring clips 31 of a spring saddle. The spring saddle is provided with sleeves 32 by which the springs are pivotally mounted on a trunnion 33 beneath the housing of the drive shafts 14 and 15. The springs are thus pivoted at a point eccentric the axis of the drive shafts, a construction which is of considerable value when the six wheel vehicle is to be provided with a broad driving surface and provided with spring mountings of dual or multiple form.

The trunnion 33 upon which the springs are pivoted is supported on a yoke 34 which extends from a plate 35 bolted to the end of the drive shaft housing 18, which plate 35 likewise provides the support for the end bearings 20 of the drive shafts. The supporting shafts 26 and 27 have their housings 29 provided with a radius rod connection 36 of any suitable preferred form with a plate 37 which is bolted, as indicated at 38, to the frame 3 and supports the frame from the drive shaft housing and springs 28. The plate 37 has bolted thereto socket members 39 forming a ball and socket connection with the radius rods 36.

The driven wheels each comprises a driven hub 40 mounted on longitudinally spaced roller bearings 41 and 42 on extensions of the axles 26 or 27. The driven hubs 40 are bolted to a drum 43 which carries the sprocket 24 for the chain drive 22 and likewise serves as a brake drum for the vehicle. Between bearings 41 and 42 there is suitably secured to the driven hubs 40 a pair of tire rims 44 and 45 for mounting tires 46 and 47, respectively. By the construction thus described each driven wheel or driven hub 40 is rigidly secured to a pair of driven tires, the load of which is centered between bearings 41 and 42. In order to provide for additional driven and supporting area an auxiliary driven hub 48 is mounted on roller bearings 49 and 50 at a reduced end of one of the supporting axles 26 or 27. Such auxiliary driven wheel or hub can not be rigidly driven with advantage together with the driven hub 40 for the reason that the broad traction area thereby provided would cause excessive wear on the tires during turning movements or because of the irregularity of the road surface. The auxiliary driving hub 48 is, therefore, frictionally driven from the hub 40. For this purpose the driven hub 48 is provided with a clutch face 51 engaging clutch line 52 held between the plate 51 and the clutch plate 53 rigidly connected to the driven hub 40. By the construction thus described the driven hub 48 is frictionally driven with the driven hub 40, but under certain conditions may yield relative thereto in order to relieve the traction surface of excessive friction in operation. The auxiliary driving hub 40 is shown as provided with a tire supporting flange 54 for supporting the tire 55, although it is obvious that where greater traction surface might be required the auxiliary driven hub might support a plurality of tires.

The brake drum 43 of the driven wheels may be controlled by any usual or preferred braking mechanism, and for this purpose there is indicated an internal brake lining 56a mounted on shoes 56, which are in turn controlled by cam shaft 57 actuated by any suitable means such as an air chamber 58.

While the particular form of the six wheel truck herein described is well adapted to embody the objects of the present invention, it is to be understood that various modifications and changes may be made and the invention includes all such modifications and changes as come within the scope of the appended claims.

I claim:

1. A motor vehicle including a frame, differential drive shafts carried by said frame and horizontally aligned complementary spring members pivoted to a common trunnion located below the axis of said drive shafts, longitudinally spaced apart supporting axles, one supporting axle slidably engaging one end of each of said springs and the other supporting axle slidably engaging the opposite ends of said springs, radius rods connecting said axles to said frame, wheels on the ends of said axles and drive connections between said wheels and said differential drive shafts.

2. A motor vehicle comprising a frame, differential drive shafts carried by said frame, trunnions supported at each side of the frame and located below the axes of the drive shafts of such differential and in vertical alignment therewith, two pair of springs, the springs of each pair being horizontally aligned, one pair of springs being located on each side of the frame and pivoted to one of said trunnions at its central portion, spaced supporting axles extending from side to side of the frame and slidably engaging the ends of said springs, and radius rod connections between said supporting axles and said frame.

3. A motor vehicle comprising a frame, differential drive shafts carried by said frame, a trunnion supported by said frame below the axes of said drive shafts at each side of said frame, each trunnion pivotally supporting a pair of spring members at their centers, said spring members being complementary in form, a pair of supporting axles extending from side to side of the frame and each having sliding supporting contact with the ends of said spring members, and radius rod connections between said axles and said frame.

RAYMOND LEWIS.